United States Patent
Schmidt et al.

(10) Patent No.: US 10,309,018 B2
(45) Date of Patent: Jun. 4, 2019

(54) COMPOSITE ARTICLE HAVING LAYER WITH CO-CONTINUOUS MATERIAL REGIONS

(75) Inventors: Wayde R. Schmidt, Pomfret Center, CT (US); Paul Sheedy, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 341 days.

(21) Appl. No.: 13/149,027

(22) Filed: May 31, 2011

(65) Prior Publication Data
US 2012/0308842 A1 Dec. 6, 2012

(51) Int. Cl.
*C23C 28/00* (2006.01)
*C04B 41/89* (2006.01)
(Continued)

(52) U.S. Cl.
CPC ........ *C23C 28/3215* (2013.01); *C04B 41/009* (2013.01); *C04B 41/52* (2013.01); *C04B 41/89* (2013.01); *C23C 28/00* (2013.01); *C23C 28/34* (2013.01); *C23C 28/341* (2013.01); *C23C 28/345* (2013.01); *C23C 28/3455* (2013.01); *C23C 28/40* (2013.01); *C23C 28/42* (2013.01); *C23C 28/44* (2013.01); *F01D 5/282* (2013.01); *F01D 5/284* (2013.01); *F01D 5/288* (2013.01); *F01D 11/122* (2013.01); *F05D 2300/12* (2013.01); *F05D 2300/175* (2013.01); *F05D 2300/21* (2013.01); *F05D 2300/22* (2013.01); *Y10T 428/12486* (2015.01); *Y10T 428/24752* (2015.01)

(58) Field of Classification Search
None
See application file for complete search history.

(56) References Cited

U.S. PATENT DOCUMENTS 3,956,014 A    5/1976  Landsman et al.
4,111,723 A *  9/1978  Lemkey .................. C30B 21/02
                                            148/404
(Continued)

FOREIGN PATENT DOCUMENTS

EP    0139396    *  8/1984
EP    1645652       4/2006
(Continued)

OTHER PUBLICATIONS

Merriam Webster's Collegiate Dictionary, Tenth Edition, Merriam Webster, Inc., 1997, p. 39.*

(Continued)

*Primary Examiner* — Daniel J. Schleis
(74) *Attorney, Agent, or Firm* — Carlson, Gaskey & Olds, P.C.

(57) ABSTRACT

A composite article includes a substrate, at least one protective layer on the substrate, and an intermediate layer between the protective layer and the substrate. The intermediate layer includes a first material that occupies a first continuous region and a second material that occupies a second continuous region next to the first continuous region. The first continuous region and the second continuous region are each in contact with the substrate and the protective layer.

9 Claims, 1 Drawing Sheet

(51) Int. Cl.
  *C04B 41/00* (2006.01)
  *C04B 41/52* (2006.01)
  *F01D 5/28* (2006.01)
  *F01D 11/12* (2006.01)

(56) References Cited

U.S. PATENT DOCUMENTS

| | | | |
|---|---|---|---|
| 4,639,388 A * | 1/1987 | Ainsworth et al. | 428/117 |
| 5,030,517 A * | 7/1991 | Gilman et al. | 428/549 |
| 5,242,264 A * | 9/1993 | Kojima et al. | 415/200 |
| 5,304,031 A * | 4/1994 | Bose | 277/411 |
| 5,391,428 A * | 2/1995 | Zender | 428/34.4 |
| 5,622,751 A | 4/1997 | Thebault et al. | |
| 5,628,938 A | 5/1997 | Sangeeta et al. | |
| 5,902,429 A | 5/1999 | Apte et al. | |
| 5,997,517 A | 12/1999 | Whitbourne | |
| 6,042,880 A * | 3/2000 | Rigney et al. | 427/142 |
| 6,210,812 B1 * | 4/2001 | Hasz et al. | 428/621 |
| 6,455,173 B1 * | 9/2002 | Marijnissen et al. | 428/623 |
| 6,706,319 B2 * | 3/2004 | Seth et al. | 427/190 |
| 6,759,151 B1 * | 7/2004 | Lee | 428/701 |
| 6,780,458 B2 * | 8/2004 | Seth et al. | 427/201 |
| 6,802,878 B1 * | 10/2004 | Monroe | 51/307 |
| 6,905,559 B2 * | 6/2005 | O'Hara et al. | 148/410 |
| 7,264,887 B2 * | 9/2007 | Khan et al. | 428/632 |
| 7,422,771 B2 * | 9/2008 | Pietraszkiewicz et al. | 427/255.7 |
| 7,871,578 B2 | 1/2011 | Schmidt | |
| 2007/0009754 A1 | 1/2007 | Dzugan et al. | |
| 2008/0044662 A1 * | 2/2008 | Schlichting et al. | 428/426 |
| 2008/0145694 A1 * | 6/2008 | Bucci | C23C 4/02 428/621 |
| 2008/0271595 A1 * | 11/2008 | Bird et al. | 89/36.02 |
| 2009/0252985 A1 * | 10/2009 | Nagaraj | C23C 4/10 428/613 |
| 2010/0074726 A1 | 3/2010 | Merrill | |
| 2010/0081558 A1 | 4/2010 | Taylor | |

FOREIGN PATENT DOCUMENTS

| | | |
|---|---|---|
| EP | 1645660 | 4/2006 |
| EP | 2025458 | 2/2009 |
| EP | 2062999 | 5/2009 |
| WO | WO9515267 | * 11/1994 |
| WO | 0046420 | 8/2000 |

OTHER PUBLICATIONS

Vander Voort, George F. (2004). ASM Handbook, vol. 09—Metallography and Microstructures—1. Metallography: An Introduction. ASM International.*

Wang, L., Lau, J., Thomas, E. L. and Boyce, M. C. (2011), Co-Continuous Composite Materials for Stiffness, Strength, and Energy Dissipation. Adv. Mater., 23: 1524-1529.*

Decision to Refuse a European Patent Application, Application No. 12 170 075.1-1103, EPO, dated Dec. 18, 2018. (Year: 2018).*

Extended European Search Report for European Patent Application No. 12170075.1 dated Mar. 6, 2014.

* cited by examiner

COMPOSITE ARTICLE HAVING LAYER WITH CO-CONTINUOUS MATERIAL REGIONS

BACKGROUND

This disclosure relates to composite articles, such as those used in gas turbine engines.

Components, such as gas turbine engine components, may be subjected to high temperatures, corrosive and oxidative conditions, and elevated stress levels. In order to improve the thermal and oxidative stability of these components, the component may include one or more of a protective environmental barrier, thermal barrier, velocity barrier, erosion resistant, or abradable coating. The protective coating may be a multi-layer coating that includes a top coat and a bond coat beneath the top coat to adhere the top coat to the underlying substrate.

SUMMARY

Disclosed is a composite article that includes a substrate, at least one protective layer on the substrate, and an intermediate layer between the protective layer and the substrate. The substrate may include at least one of a metallic alloy material, a ceramic material or carbon, and the at least one protective layer includes a ceramic material, metallic alloy, carbon or combinations thereof. The intermediate layer includes a first material that occupies a first continuous region and a second material that occupies a second continuous region next to the first continuous region. The first continuous region and the second continuous region are each in contact with the substrate, which is a bond coat if present, and the protective layer.

Also disclosed is a method of processing the composite article that includes forming the intermediate layer on the substrate, which is a bond coat if present, and forming the at least one protective layer on the intermediate layer.

The various features and advantages of the disclosed examples will become apparent to those skilled in the art from the following detailed description. The drawings that accompany the detailed description can be briefly described as follows.

DETAILED DESCRIPTION

Figure 1:
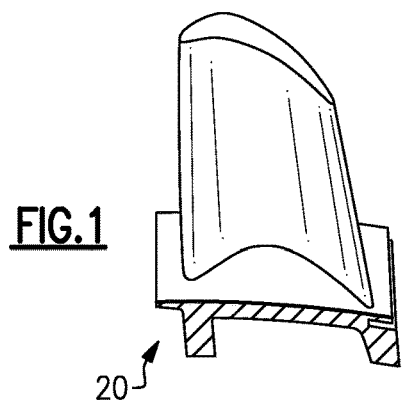
FIG. 1 schematically illustrates an example composite article that is a turbine blade.
Figure 2:
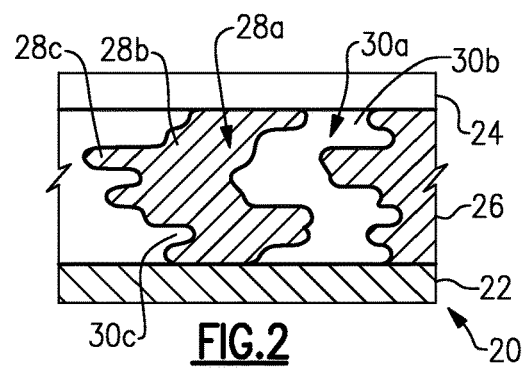
FIG. 2 schematically illustrates a cross-section of a portion of a composite article having a co-continuous microstructure.

FIG. 1 shows a composite article 20. In this example, the composite article 20 is a turbine blade for a gas turbine engine, although this disclosure is not limited to such components. The composite article 20 may alternatively be a turbine vane, compressor blade or vane, combustor liner, blade outer air seal or other component that would benefit from this disclosure. It is also to be understood that the composite article 20 is not limited to components that are used for gas turbine engines and that components in other fields will also benefit from this disclosure.

nom FIG. 2 shows a cross-section of a portion of the composite article 20. As an example, the portion may be from the airfoil-shaped blade section of the turbine blade. The composite article 20 includes a substrate 22, at least one protective layer 24 on the substrate 22, and an intermediate layer 26 between the at least one protective layer 24 and the substrate 22. The at least one protective layer 24 and the intermediate layer 26 together may be considered to be an environmental barrier, a thermal barrier, a velocity barrier, an erosion resistant coating, or an abradable coating, depending upon the materials selected. As will be described in further detail, the intermediate layer 26 is designed with a multi-functional microstructure.

The intermediate layer 26 includes a first material 28a that occupies a first continuous region 28b and a second, different material 30a that occupies a second continuous region 30b next to the first continuous region 28b. That is, the second material 30a is different from the first material 28a in at least one of composition, microstructure (e.g., crystallographic phase and/or orientation), or other physical property such that the regions 28b and 30b are perceptibly distinct (e.g., such as by metallographic techniques).

As shown, the first continuous region 28b and the second continuous region 30b are each in contact with the substrate 22 and the protective layer 24. In that regard, the first continuous region 28b and the second continuous region 30b are co-continuous regions that each extend without interruption from the upper surface of the intermediate layer 26 to the lower surface of the intermediate layer 26. It is to be understood that the first continuous region 28b and the second continuous region 30b are shown in a two-dimensional rendering in FIG. 2 for purposes of description, but that the first continuous region 28b and the second continuous region 30b may be continuous, intertwined three-dimensional regions that each have at least one area of contact with the substrate 22 (on the bottom surface of the intermediate layer 26) and one area of contact with the protective layer 24 (on the top surface of the intermediate layer 26).

In the illustrated example, the first continuous region 28b and the second continuous region 30b interpenetrate each other. That is, the first continuous region 28b has relatively narrow protrusions 28c or "fingers" that extend into relatively broad portions of the second continuous region 30b. Likewise, the second continuous region 30b has relatively narrow protrusions 30c or "fingers" that extend into relatively broad portions of the first continuous region 28b. Additionally, in the illustrated example, the first continuous region 28b and the second continuous region 30b are amorphous in shape and thereby lack any definite form or pattern.

In the illustrated example, the first material 28a and the second material 30a are selected to serve different functions within the composite article 20. For instance, the first material 28a and the second material 30a may individually provide adhesion between the substrate 22 and the protective layer 24, oxygen gettering, thermal expansion matching between the substrate 22 and the protective layer 24, thermo-mechanical compliance or other desired function in the composite article 20. By selecting the first material 28a to be different from the second material 30a in at least one of composition or microstructure (e.g., crystallographic phase and/or orientation) or other physical property, the intermediate layer 26 serves different functions in the composite article 20.

The materials selected for the substrate 22, first material 28a, second material 30a, and protective layer 24 depend upon the desired functions in the intermediate layer 26 and end use of the composite article 20. It is to be understood that the below-described example materials for the substrate 22, first material 28a, second material 30a, and protective layer 24 may be constituents in the respective compositions of the substrate 22, first material 28a, second material 30a, and protective layer 24 or may compose the respective compositions of the substrate 22, first material 28a, second material 30a, and protective layer 24 to the exclusion of other materials in the compositions, with the exception of trace impurities.

In general, the first material 28a and the second material 30a include different metallic materials, ceramic materials, glasses or glass ceramics or carbon, or one may include a metallic material (and exclude ceramic materials, glasses or glass ceramics or carbon) and the other may include a ceramic material, glass, or glass ceramic or carbon (and exclude metallic materials). The following are examples from which the first material 28a and second material 30a are selected, in any and all combinations thereof.

An example of the metallic material is MCrAlY and the various compositions thereof, where the M includes at least one of nickel, cobalt, iron or a combination thereof, Cr is chromium, Al is aluminum and Y is yttrium. The first material 28a and the second material 30a may include different compositions of MCrAlY. In other examples, the metallic material is aluminum or aluminum-based alloy, titanium or titanium-based alloy, steel or stainless steel. In further examples, the metallic material is based on zirconium, molybdenum, niobium, or tantalum, or is a non-superalloy based on iron, nickel, cobalt or chromium.

An example of the ceramic material is an oxide, carbide, nitride, boride, silicide, oxycarbide, oxynitride, carbonitride, aluminide, silicate, titanate, phosphate, phosphide or combination thereof. In some examples, the oxide ceramic is zirconia (e.g., stabilized or unstabilized), hafnia, gadolinia, a silicate or a combination thereof. The silicate may be a rare earth element silicate, which includes at least one rare earth element from the group of fifteen lanthanides, scandium and yttrium. The silicate may include boron. In one example, the rare earth silicate is yttrium silicate. In a further example, the first material 28a is a silicate material, such as yttrium silicate, and the second material 30a is zirconia. In another example, the first material 28a is stabilized or unstabilized zirconia and the second material 30a is the other of stabilized or unstabilized zirconia. In another example, the first material 28a is cubic boron nitride and the second material 30a is hexagonal boron nitride.

Examples of a glass material include silica, borosilicates, barium aluminosilicates, lanthanum aluminosilicates, strontium magnesium silicates, barium magnesium aluminosilicates and lithium-containing glasses.

The substrate 22 in the illustrated example includes at least one of a metallic material, a superalloy material, a ceramic material or carbon. In embodiments, the metallic material is aluminum or aluminum-based alloy, titanium or titanium-based alloy, steel or stainless steel. The superalloy material may be a nickel-based or cobalt-based alloy. In a further example, the substrate 22 is based on zirconium, molybdenum, niobium, or tantalum, or is a non-superalloy based on iron, nickel, cobalt or chromium The ceramic material may be selected from carbides, oxides, nitrides, borides, silicides, oxycarbides, oxynitrides, carbonitrides, aluminides, silicates, titanates, phosphates, phosphides and combinations thereof. In a further example, the ceramic material is a silicon-based ceramic material, such as silicon carbide, silicon oxycarbide, silicon oxynitride, or glass, glass/ceramic material, or other oxide, carbide, nitride, boride or combination thereof that includes silicon.

The substrate 22 may be monolithic form (i.e., formed of a single, continuous mass of material) or a composite of several different ceramic materials or ceramic and metallic materials and glasses or glass ceramics or carbon. In one example, the substrate 22 is a ceramic matrix composite, where the ceramic matrix material forms a continuous phase in which a phase of another material, such as a reinforcement material, is dispersed. The ceramic matrix may be selected from carbides, oxides, nitrides, borides, silicides, oxycarbides, oxynitrides, carbonitrides, aluminides, silicates, titanates, phosphates, phosphides and combinations thereof.

The at least one protective layer 24 in the illustrated example includes one or more layers of selected materials. At least one of the layers may include a ceramic material, such as an oxide ceramic. The oxide ceramic may be zirconia, hafnia, gadolinia, silicate, or combinations thereof. The silicate may include a rare earth element silicate material, as described above. In another example, the at least one protective layer 24 is a composite of at least two different materials. For instance, the at least one protective layer 24 includes distinct regions of tungsten carbide and cobalt, or distinct regions of MCrAlY and a lubricious material such as graphite, hexagonal boron nitride or molybdenum disulfide. In a further example, the first material 28a and the material of the substrate 22 may have equivalent compositions, and the second material 30a and the material of the protective layer 24 may have equivalent compositions, to enhance bonding between the substrate 22 and the protective layer 24.

The amounts of the first material 28a and the second material 30a are selected to influence the functionality and are present in sufficient amount to form the respective first continuous region 28b and second continuous region 30b. Given this description, one of ordinary skill in the art will be able to determine suitable amounts of the materials for their intended end use. On a volume basis, the first material 28a, the second material 30a and any additional materials that are to form continuous regions in the intermediate layer 26 may individually be present in amounts in a range of 1-99% such that the volumes add up to 100%, and provided that the selected amount of a material exceeds the percolation threshold of that material for forming a continuous region that connects the substrate 22 and the at least one protective layer 24. Therefore, the selected amounts will depend on the nature of the materials used and material morphology (e.g., platelets, spheres, etc.).

Figure 3:
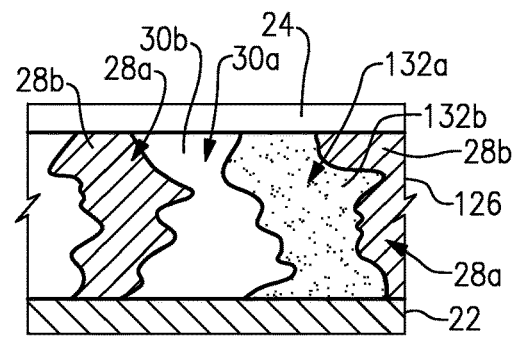
FIG. 3 schematically illustrates a cross-section of a portion of a composite article having a co-continuous microstructure with three different materials.

FIG. 3 shows a cross-section of a portion of another example composite article 120, where like reference numerals designate like elements. In this example, the composite article 120 includes the substrate 22 and the protective layer 24 as described with regard to FIG. 2, with an intermediate layer 126 between the protective layer 24 and the substrate 22. The intermediate layer 126 is similar to the intermediate layer 26 shown in FIG. 1 with regard to the first material 28a and first continuous region 28b and the second material 30a and the second continuous region 30b.

In the illustrated example, the intermediate layer 126 additionally includes a third material 132a that occupies a third continuous region 132b that is next to the first continuous region 28b, the second continuous region 30b or both. As shown, the third continuous region 132b is contiguous with the first continuous region 28b and the second continuous region 30b. Similar to the first continuous region 28b and the second continuous region 30b, the third continuous region 132b is also in contact with the substrate 22 and the protective layer 24.

The third material 132a provides the intermediate layer 126 with additional functionality in that the third material 132a is different than the first material 28a and the second material 30a in at least one of composition, microstructure (e.g., crystallographic phase and/or orientation) or other physical property. That is, the materials may be selected to serve various individual purposes, such as adhesion, oxygen gettering, thermal expansion matching, thermo-mechanical compliance or other desirable purpose within the composite article 120.

The third material 132a is selected from the given example materials disclosed for the first material 28a and the second material 30a. That is, the third material 132a includes the disclosed metallic materials, ceramic materials, glass or glass ceramics, or carbon.

Figure 4:
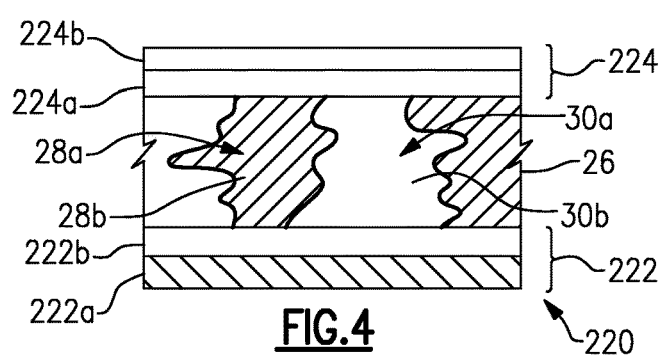
FIG. 4 schematically illustrates a cross-section of a portion of a composite article having co-continuous microstructure and multi-layered substrate and protective layer.

FIG. 4 illustrates another composite article 220, where like reference numerals designate like elements. In this example, the intermediate layer 26 is located between a substrate 222 and a protective layer 224. The substrate 222 and the protective layer 224 are each multi-layered structures. Alternatively, one of the substrate 222 or protective layer 224 is multi-layered and the other is a single layer.

In the illustrated example, the substrate 222 includes a first layer 222a and a second layer 222b. The first layer 222a is the base of the composite article 220 that generally defines the contoured shape of the article. The second layer 222b is a bond coat between the first layer 222a and the intermediate layer 26. Similarly, the protective layer 224 includes a first layer 224a and a second layer 224b. The second layer 224b is a top coat on the composite article 220 and the first layer 224a is a sub-layer between the second layer 224b and the intermediate layer 226.

In one example, the second layer 222b includes silicon metal and the first layer 224a includes zirconia. The first layer 222a of the substrate 222 includes a ceramic material, such as one of the silicon-containing ceramic materials described above. The second layer 224b of the protective layer 224 includes gadolinium and zirconium.

In this example, the first material 28a includes a silicate material, and the second material 30a includes zirconia. The combination of the first continuous region 28b and the second continuous region 30b of the given materials provides strong adhesion between the first layer 224a of the protective layer 224 and the second layer 222b of the substrate 222. The selected materials of the intermediate layer 26 also provide thermal expansion matching between the substrate 222 and the protective layer 224.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
   a substrate formed of a metal alloy or ceramic material;
   a protective layer on the substrate, the protective layer formed of a ceramic oxide; and
   an intermediate layer between, and in contact with each of, the protective layer and the substrate,
   the intermediate layer including a co-continuous microstructure first, second, and third materials of different compositions that occupy, respectively, first, second, and third distinct continuous regions in the co-continuous microstructure, the first, second, and third distinct district continuous regions being continuous with respect to extending continuously from the substrate to the protective layer,
   the second distinct continuous region is contiguous with each of the first distinct continuous region and the third distinct continuous region in the co-continuous microstructure and the first distinct continuous region is contiguous with the third distinct continuous region in the co-continuous microstructure,
   the first, second, and third distinct continuous regions are each individually amorphous in shape,
   and the first material and the substrate have equivalent compositions, the second material and the protective layer have equivalent ceramic oxide compositions, and the third material has a ceramic or metallic composition of different composition than the protective layer and the substrate.

2. The composite article as recited in claim 1, wherein the first material comprises a first ceramic material and the second material comprises a second, different ceramic material.

3. The composite article as recited in claim 1, wherein the first material comprises a metallic material and the second material comprises a ceramic material.

4. The composite article as recited in claim 1, wherein the first material comprises a first metallic material and the third material comprises a different metallic material.

5. The composite article as recited in claim 1, wherein the first material comprises a first ceramic material, the second material comprises a second, different ceramic material, and the third material comprises a third, different ceramic material.

6. The composite article as recited in claim 1, wherein the first material comprises a metallic material, the second material comprises a ceramic material and the third material comprises a different ceramic material.

7. The composite article as recited in claim 1, wherein at least one of the first material, the second material and the third material is hafnia.

8. The composite article as recited in claim 1, wherein at least one of the first material, the second material and the third material is gadolinia.

9. The composite article as recited in claim 1, wherein the first material and the substrate are a first ceramic composition, and the second material and the protective layer are a second ceramic composition.

* * * * *